United States Patent
Reynolds et al.

(10) Patent No.: US 12,046,077 B2
(45) Date of Patent: Jul. 23, 2024

(54) ASSISTANCE MANAGEMENT SYSTEM

(71) Applicant: International Business Machines Corporation, Armonk, NY (US)

(72) Inventors: Spencer Thomas Reynolds, Austin, TX (US); Raden Tonev, Austin, TX (US); Tessa Rodes, Austin, TX (US); Janelle Michiko Janyen Arita, Austin, TX (US); Danchen Sun, Redwood City, CA (US)

(73) Assignee: International Business Machines Corporation, Armonk, NY (US)

( * ) Notice: Subject to any disclaimer, the term of this patent is extended or adjusted under 35 U.S.C. 154(b) by 14 days.

(21) Appl. No.: 16/564,048

(22) Filed: Sep. 9, 2019

(65) Prior Publication Data

US 2021/0073523 A1    Mar. 11, 2021

(51) Int. Cl.

| G06V 40/20 | (2022.01) |
|---|---|
| G06F 3/16 | (2006.01) |
| G06T 7/00 | (2017.01) |
| G06T 7/20 | (2017.01) |
| G06T 7/70 | (2017.01) |
| G09G 5/373 | (2006.01) |

(52) U.S. Cl.
CPC .............. *G06V 40/20* (2022.01); *G06F 3/167* (2013.01); *G06T 7/20* (2013.01); *G06T 7/70* (2017.01); *G06T 7/97* (2017.01); *G09G 5/373* (2013.01); *G06T 2207/30196* (2013.01); *G09G 2354/00* (2013.01)

(58) Field of Classification Search
CPC ......... G06K 9/00335; G06T 7/97; G06T 7/70; G06T 7/20; G06T 2207/30196; G06F 3/167; G09G 5/373; G09G 2354/00
See application file for complete search history.

(56) References Cited

U.S. PATENT DOCUMENTS

| 7,136,710 B1 * | 11/2006 | Hoffberg | G16H 40/67 |
|---|---|---|---|
| | | | 700/83 |
| 8,494,507 B1 | 7/2013 | Tedesco et al. | |
| 8,548,203 B2 | 10/2013 | Bobbitt et al. | |
| 2005/0171664 A1 * | 8/2005 | Konig | G10L 15/22 |
| | | | 701/36 |
| 2016/0078290 A1 * | 3/2016 | Rambler | G06Q 20/208 |
| | | | 382/103 |

(Continued)

FOREIGN PATENT DOCUMENTS

EP    2728513 A1    5/2014

OTHER PUBLICATIONS

IBM, "The Accessible Workforce," IBM100, Icons of Progress, Printed Jun. 4, 2019, 3 pages http://www-03.ibm.com/ibm/history/ibm100/us/en/icons/accessibleworkforce/.

(Continued)

*Primary Examiner* — Wing H Chow
(74) *Attorney, Agent, or Firm* — Peter J. Edwards (57) ABSTRACT

A method can include determining an assistance-initiating characteristic corresponding to a user. Determining the assistance-initiating characteristic can be based, at least in part, on a user action by the user. The method can further include generating an adaptation corresponding to the assistance-initiating characteristic. Generating the adaptation can include automatically adjusting an adaptable device.

13 Claims, 5 Drawing Sheets

(56) References Cited

U.S. PATENT DOCUMENTS

| | | | |
|---|---|---|---|
| 2017/0215208 A1* | 7/2017 | Burnham | H04W 76/50 |
| 2017/0249009 A1* | 8/2017 | Parshionikar | G06F 3/0487 |
| 2018/0357875 A1* | 12/2018 | Kusens | H04N 7/18 |
| 2019/0026673 A1 | 1/2019 | Balchin et al. | |
| 2019/0073448 A1 | 3/2019 | Kochura et al. | |
| 2019/0108742 A1 | 4/2019 | Stolbikov et al. | |
| 2019/0172426 A1* | 6/2019 | Ni | G06T 7/50 |

OTHER PUBLICATIONS

Unknown, "Deafness and hearing loss," World Health Organization, Dated Mar. 20, 2019, Printed Jun. 4, 2019, 6 pages, http://www.who.int/news-room/fact-sheets/detail/deafness-and-hearing-loss.

Unknown, "Blindness and vision impairment," World Health Organization, Dated Oct. 11, 2018, Printed Jun. 4, 2019, 4 pages, http://www.who.int/news-room/fact-sheets/detail/blindness-and-visual-impairment.

Mell et al., "The NIST Definition of Cloud Computing", Recommendations of the National Institute of Standards and Technology, Sep. 2011, 7 pages.

* cited by examiner

ASSISTANCE MANAGEMENT SYSTEM

BACKGROUND

The present disclosure relates to user assistance, and more specifically, to user assistance with tasks in public venues.

A public venue, such as a shopping mall or an airport, can include technology that assists a user with accessing and navigating the venue. For example, a shopping mall can include a door-opening device to facilitate entering the shopping mall. In another example, an airport can include kiosks and/or interactive displays to assist users with locating airline gates or with checking in and printing boarding passes.

SUMMARY

According to embodiments of the present disclosure, a method can include determining an assistance-initiating characteristic. The assistance-initiating characteristic can correspond to a user. Determining the assistance-initiating characteristic can be based, at least in part, on a user action by the user. The method can further include generating an adaptation. The adaptation can correspond to the assistance-initiating characteristic. Generating the adaptation can include automatically adjusting an adaptable device.

A system and a computer program product corresponding to the above method are also included herein.

The above summary is not intended to describe each illustrated embodiment or every implementation of the present disclosure.

BRIEF DESCRIPTION OF THE DRAWINGS

The drawings included in the present application are incorporated into, and form part of, the specification. They illustrate embodiments of the present disclosure and, along with the description, serve to explain the principles of the disclosure. The drawings are only illustrative of certain embodiments and do not limit the disclosure.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention.

DETAILED DESCRIPTION

Aspects of the present disclosure relate to providing assistance to a user; more particular aspects relate to providing assistance to a user in response to monitored user actions. While the present disclosure is not necessarily limited to such applications, various aspects of the disclosure may be appreciated through a discussion of various examples using this context.

Businesses and organizations can utilize technology and personnel to assist their patrons. For example, airports can include display screens that present information regarding flight arrivals and departures, as well as kiosks for checking in and printing boarding passes. Additionally, airports can employ personnel who can assist individuals with tasks such as obtaining information and navigating the airport. While such resources can be helpful, they can also include shortcomings. For example, a traveler who has a visual impairment can experience difficulty reading display screens and using touch-controlled interfaces. Furthermore, for such a traveler to locate and receive assistance from airport personnel can be a time-consuming and frustrating process.

To address these and other problems, embodiments of the present disclosure include a system and method for determining assistance-initiating characteristics from a user's monitored actions, and in response, generating an automatic adaptation to assist the user. By generating such an automatic adaptation, embodiments of the present disclosure can tailor a user's interaction with devices at a venue such that the devices can automatically accommodate the user's needs. Additionally, embodiments of the present disclosure can improve a user's experience at a venue by facilitating the user's ability to efficiently interact with people and devices at the venue.

Embodiments of the present disclosure can include an assistance management system. In some embodiments, the assistance management system can communicate with a set of data capture devices (e.g., cameras) to obtain images of a user. In some embodiments, the assistance management system can analyze the images of the user and determine assistance-initiating characteristics (e.g., user actions that can indicate that the user may benefit from an adaptation (e.g., an assistive, automatic adjustment to a device utilized by the user)).

For example, in some embodiments, an assistance management system can obtain images of a user who is using a long white cane while walking. In this example, the assistance management system can determine that use of a long white cane while walking is an assistance-initiating characteristic, as such use of a long white cane can indicate that the user may have a visual impairment, such as low vision or blindness. In this example, the assistance management system can automatically generate a corresponding adaptation, which can include: adjusting the brightness of a set of lights within a threshold distance (e.g., within 1 m to 5 m (3.3 ft. to 16.4 ft.)) of the user; switching an interface controller of a device such as a kiosk or an elevator from a touch-controlled mode of operation to a voice-controlled mode of operation; and/or adjusting the brightness and size of text presented on a display viewed by the user.

In another example, in some embodiments, an assistance management system can obtain images of a user who repeatedly uses hand signals in the presence of individuals proximate the user. In this example, the assistance management system can determine that such use of hand signals is an assistance-initiating characteristic. Further in this example, the assistance management system can detect parameters of the hand signal usage, such as a frequency of use and a time duration of use. Further in this example, the assistance management system can determine whether the parameters exceed predetermined thresholds, and if so, automatically generate an adaptation in response. In this example, the combination of the hand signal usage, the frequency of the hand signal usage, and the time duration of the hand signal usage can indicate that the user may have a hearing impairment. In this example, the assistance management system can automatically generate a corresponding adaptation, which can include: switching an interface controller of a kiosk such that a touch-controlled mode of operation is active and a voice-controlled mode of operation is inactive, and transmitting a transcript of an audible public announcement to a user device, such as a smart phone.

Figure 1:
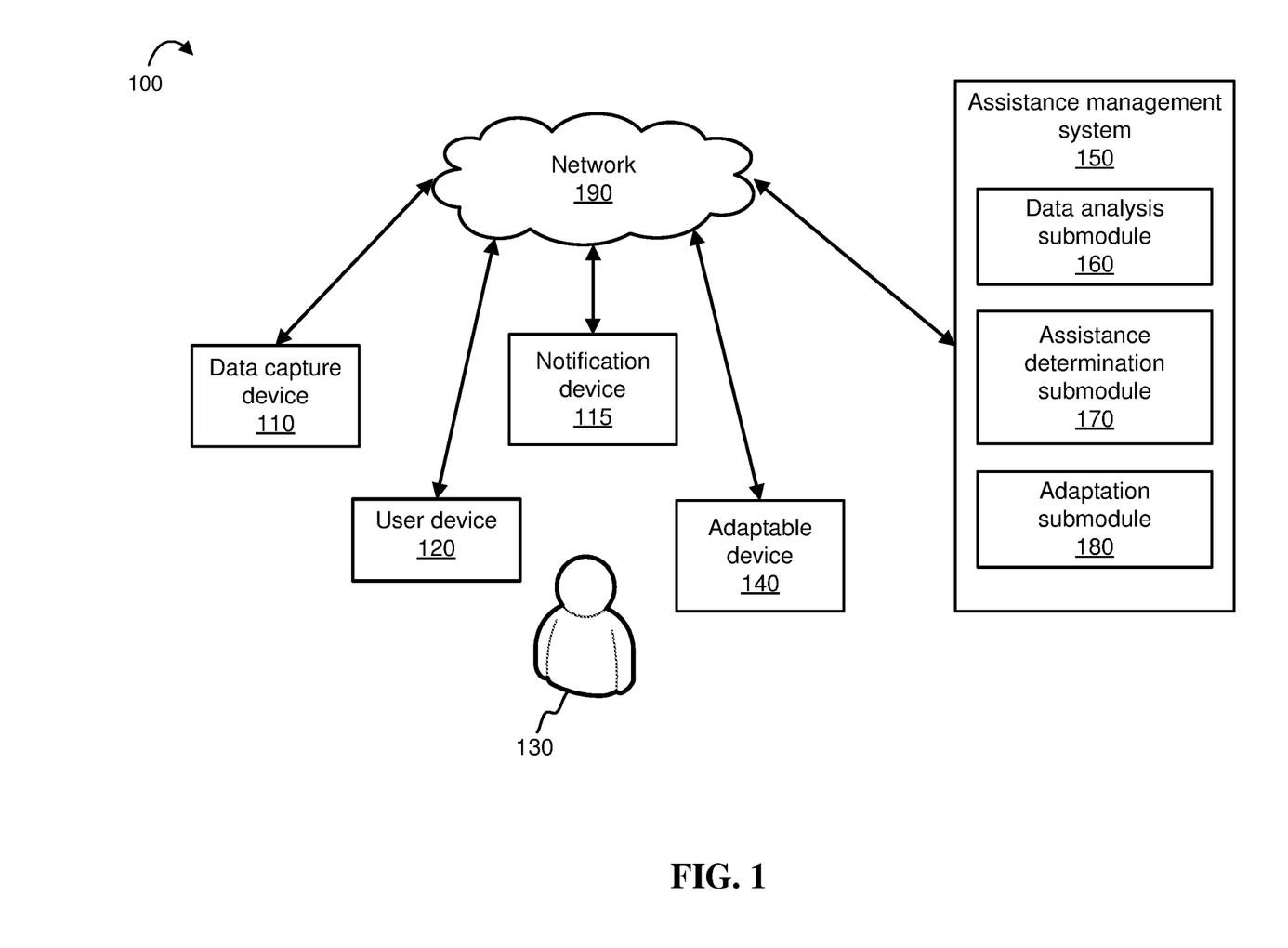
FIG. 1 depicts an example computing environment that includes an assistance management system, in accordance with embodiments of the present disclosure.

Turning to the figures, FIG. 1 illustrates an example computing environment 100 that can include a user 130 and an assistance management system 150. Computing environment 100 can include one or more of each of the following: a data capture device 110, a user device 120, a notification device 115, an adaptable device 140, and a network 190. In some embodiments, one or more of the assistance management system 150, data capture device 110, user device 120, notification device 115, adaptable device 140, and network 190 can include a computer system, such as the computer system 301 described with respect to FIG. 3.

In some embodiments, the assistance management system 150 can exchange data with at least one data capture device 110, user device 120, notification device 115, and/or adaptable device 140 through network 190. In some embodiments, the network 190 can be a wide area network (WAN), a local area network (LAN), the Internet, or an intranet. In some embodiments, the network 190 can be substantially similar to, or the same as, cloud computing environment 50 described in FIG. 5.

Referring back to FIG. 1, in some embodiments, data capture devices 110 can include one or more devices that can monitor actions of the user 130. For example, in some embodiments, data capture devices 110 can include cameras that can capture still and/or moving images and/or sound recordings of the user 130 and the user's surroundings. In some embodiments, data capture devices 110 can include sensors for detecting motion and position (e.g. beacon technology capable of monitoring a position of a mobile device, such as a smart phone). In some embodiments, data capture devices 110 can electronically transmit data to the assistance management system 150 through the network 190.

In some embodiments, an adaptable device 140 can be a device that is configured to automatically adjust at least one of its settings or its modes of operation. In some embodiments, such automatic adjusting can be included in an adaptation generated by the assistance management system 150. For example, in some embodiments, an adaptable device 140 can include a display that is configured to automatically adjust one or more settings, such as a brightness of the display, a size of text and/or images shown on the display, and a contrast of the display. In some embodiments, an adaptable device 140 can include a user interface controller that is configured to switch a device, such as a kiosk, between touch-screen-controlled operation and voice-controlled operation. In some embodiments, one or more capture devices 110 can be integrated into an adaptable device 140. For example, in some embodiments, an adaptable device 140 can include a display screen showing arrival and departure times at an airport. In this example, the display screen can include a camera as a data capture device 110. Further in this example, the camera can obtain images of the user for use in accordance with embodiments of the present disclosure.

In some embodiments, a notification device 115 can transmit messages to one or more people, such as a user and/or support staff, in response to messages and/or commands from the assistance management system 150. For example, in some embodiments, a notification device 115 can include a set of speakers, such as a public announcement system. In some embodiments, a notification device 115 can include a computing device, such as a tablet of a store clerk, that is configured to notify the store clerk that assistance is needed in response to a communication, such as message or command, from the assistance management system 150.

In some embodiments, the assistance management system 150 can obtain data about the user 130 from a user device 120. In some embodiments, a user device 120 can include one or more portable communication devices, such as a mobile phone, tablet, or smart watch. In some embodiments, the user 130 can use the user device 120 to consent or deny consent to the assistance management system 150 obtaining data about the user 130. In some embodiments, the user 130 can use the user device 120 to provide feedback to the assistance management system 150, as discussed in further detail below. In some embodiments, the user device 120 can receive notices such as text messages or audible messages from the assistance management system 150, as discussed in further detail below.

In some embodiments, the assistance management system 150 can include a data analysis submodule 160, an assistance determination submodule 170, and an adaptation submodule 180. In some embodiments, one or more of the data analysis submodule 160, assistance determination submodule 170, and the adaptation submodule 180 can be integrated into a processor of the assistance management system 150. In some embodiments, one or more of the data analysis submodule 160, assistance determination submodule 170, and the adaptation submodule 180 can include a computer system such as the computer system 301 described with respect to FIG. 3. In some embodiments, one or more of the data analysis submodule 160, assistance determination submodule 170, and the adaptation submodule 180 can be discrete components that are external to the assistance management system 150. In some embodiments, the assistance management system 150 can perform one or more of the method steps shown in FIG. 2.

In some embodiments, the data analysis submodule 160 can obtain data from a data capture device 110. In some embodiments, such data can include images of the user 130 from cameras as well as motion and position information of the user 130 from sensors. In some embodiments, the data analysis submodule 160 can implement technology such as image analysis technology and/or audio analysis technology to identify data features included in the obtained data. In some embodiments, data features can include information such as objects and/or people included in images. In some embodiments, data features can include sounds, physical characteristics, movements (e.g., user actions), locations, and/or relative positions of people and/or objects that are included in images.

For example, in some embodiments, the data analysis submodule 160 can obtain images that include two objects moving in close proximity to one another. In this example, the data analysis submodule 160 can implement image analysis technology to identify data features included in the obtained images, such as whether the two objects are two human pedestrians, or a human pedestrian and an animal, such as a service dog, or a human pedestrian and a device, such as a shopping cart. In some embodiments, the data analysis submodule 160 can implement image analysis technology to identify, as data features, items that a user 130 can be wearing, carrying, and/or utilizing. In some embodiments, the data analysis submodule 160 can implement image analysis technology to identify a variety of user actions as data features. For example, in some embodiments, the data analysis submodule 160 can identify whether a user is walking with a cane; using (e.g., wearing) an assistive sensory device, such as eyewear or a hearing aid; or using an assistive mobility device, such as a pair of crutches, a wheelchair, or a scooter. In some embodiments, the data analysis submodule 160 can implement image analysis technology to identify a user action such as walking with a service animal. In some embodiments, the data analysis submodule 160 can implement image analysis technology to identify user actions such as a user making hand signals, squinting, positioning himself or herself in close proximity to a display, or lingering in approximately in the same location for a period of time.

In some embodiments, the data analysis submodule 160 can detect one or more parameters of data features that are included in obtained data. For example, in some embodiments, the data analysis submodule 160 can implement image analysis technology and/or obtained motion and position information to detect parameters such as a distance between two people who are walking together; a velocity at which a user 130 is moving; a distance between a user and an adaptable device 140, such as a kiosk; a number of times a user 130 uses hand signals; and an amount of time a user 130 remains approximately in the same location. In some embodiments, the data analysis submodule 160 can detect one or more parameters of one or more assistance-initiating characteristics (discussed in more detail below) and transmit the one or more parameters to the assistance determination submodule 170.

In some embodiments, the assistance determination submodule 170 can obtain output data from the data analysis submodule 160. In some embodiments, the output data can include data features identified by the data analysis submodule 160 and/or parameters of data features identified by the data analysis submodule 160. In some embodiments, the assistance determination submodule 170 can determine whether one or more data features can be one or more assistance-initiating characteristics. In some embodiments, an assistance-initiating characteristic can be a data feature or a set of data features that correspond to a user 130 (e.g., relate to a user 130's actions and/or proximate surroundings) and indicate that a user 130 may benefit from an adaptation. In some embodiments, an adaptation can include providing assistance to a user 130 (e.g., automatically adjusting a device, such as adaptable device 140, to facilitate the user 130's ability to accomplish a task (adaptations are discussed in further detail below)). In some embodiments, an assistance-initiating characteristic can correspond to one or more thresholds. In some embodiments, the assistance determination submodule 170 can compare parameters of data features and/or parameters of assistance-initiating characteristics to the one or more thresholds. By performing such a comparison, the assistance determination submodule 170 can determine whether an adaptation should be generated.

In some embodiments, assistance-initiating characteristics and corresponding thresholds can be predetermined by an entity such as a programmer or an operator of the assistance management system 150. In some embodiments, assistance-initiating characteristics and corresponding thresholds can be determined by the assistance management system 150 (e.g., by implementing statistical analysis or machine learning technology to assess the likelihood that particular data features correspond to particular adaptations that can assist a user 130). In some embodiments, the assistance management system 150 can include a database of predetermined assistance-initiating characteristics and corresponding thresholds. In these embodiments, the assistance management system 150 can determine whether a data feature, among the obtained data features, is an assistance-initiating characteristic by comparing the data feature to the predetermined assistance-initiating characteristics stored in the database and determining if a match exists. In some embodiments, the assistance determination submodule 170 can compare parameters of data features (including parameters of data features that are determined to be assistance-initiating characteristics) to the predetermined thresholds stored in the database to determine whether the assistance management system 150 can generate an adaptation.

For example, in some embodiments, a user at an airport can look up information on an adaptable device 140. In this example, the adaptable device 140 can be a kiosk. Further in this example, the kiosk can include data capture devices 110, such as a camera and an audio recording device. Continuing with this example, a computer system of the kiosk can include an assistance management system 150. Continuing with this example, the user 130, while reading messages that appear on the display of the kiosk, may squint his eyes and position his face in close proximity to the display (e.g., within 0.61 m (2 feet) of the display). In this example, the camera included in the kiosk can capture images of the user 130 and transfer the images to the assistance management system 150. Further in this example, a data analysis submodule 160 of the assistance management system 150 can implement image analysis technology on the images to identify the data features of the user 130's squinted eyes and the close proximity of the user 130's face to the display of the kiosk. Further in this example, the data analysis submodule 160 can detect parameters of the data features, such as a length of time that the user 130's eyes remain squinted while viewing the display of the kiosk and a distance between the user 130's face and the display of the kiosk. Further in this example, the data analysis submodule 160 can electronically transmit output data to an assistance determination submodule 170 of the assistance management system 150, and the output data can include an identification of data features (e.g., the user 130's squinted eyes and the user 130's close proximity to the kiosk) and parameters (e.g., time duration of squinting and a distance between the user 130's face and the display of the kiosk). Further in this example, the assistance determination submodule 170 can compare these data features to predetermined assistance-initiating characteristics stored in a database and determine that the data features match assistance-initiating characteristics stored in the database (e.g., the database includes squinted eyes and close proximity between a user 130 and a display as assistance-initiating characteristics). Further in this example, the assistance determination submodule 170 can compare the parameters of the data features (e.g., an eye-squinting time of 45 seconds and a 0.3-m (1-ft.) distance between the user 130's face and the display of the kiosk) to thresholds corresponding to the assistance-initiating characteristics (e.g., an eye-squinting time threshold of 30 seconds and a 0.45-m (1.5-ft.) threshold distance between the user 130's face and the display of the kiosk) and determine that the thresholds are exceeded (e.g., the user 130's eyes are squinted for more than 30 seconds and the distance between the user 130's face and the display of the kiosk is less than 0.45 m (1.5 ft.)). Further in this example, the assistance determination submodule 170 can electronically transmit its determination results to the adaptation submodule 180.

In some embodiments, the adaptation submodule 180 can obtain output data from the assistance determination submodule 170. In some embodiments, the output data can include an identification of one or more assistance-initiating characteristics. In some embodiments, the adaptation submodule 180 can generate an adaptation based on the output data from the assistance determination submodule 170. In some embodiments, generating an adaptation can include at least one of the following automatic modifications: adjusting lighting (e.g., increasing or decreasing brightness) in an area where a user is located; changing a communication interface of an adaptable device 140, such as a kiosk (e.g., changing a device's mode of operation such that it can accept voice-commands in place of, or in addition to, touch-screen commands, and vice versa); adjusting a display (e.g., increasing or decreasing a size of text and/or images on a display; changing colors, contrast, or brightness of a display); providing an alternate form of communication (e.g., transmitting a transcript of an audible public announcement, such as an announcement of a found item at an airport, to a user device 120 in addition to projecting the notice over a public address system); and notifying support staff that assistance may be needed. In some embodiments, the adaptation submodule 180 can issue a command to an adaptable device 140 to implement an adaptation (e.g., to increase the brightness on the display of an adaptable device). In some embodiments, the adaptation submodule 180 can electronically transmit a message and/or a command to a user device 120 or a notification device 115 to implement an adaptation. For example, continuing with the example discussed above, in response to the data transmitted from the assistance determination submodule 170, the adaptation submodule 180 can generate an adaptation that includes increasing a size of text and/or images on the display to improve the user's ability to read and interpret the text and/or images.

Figure 2:
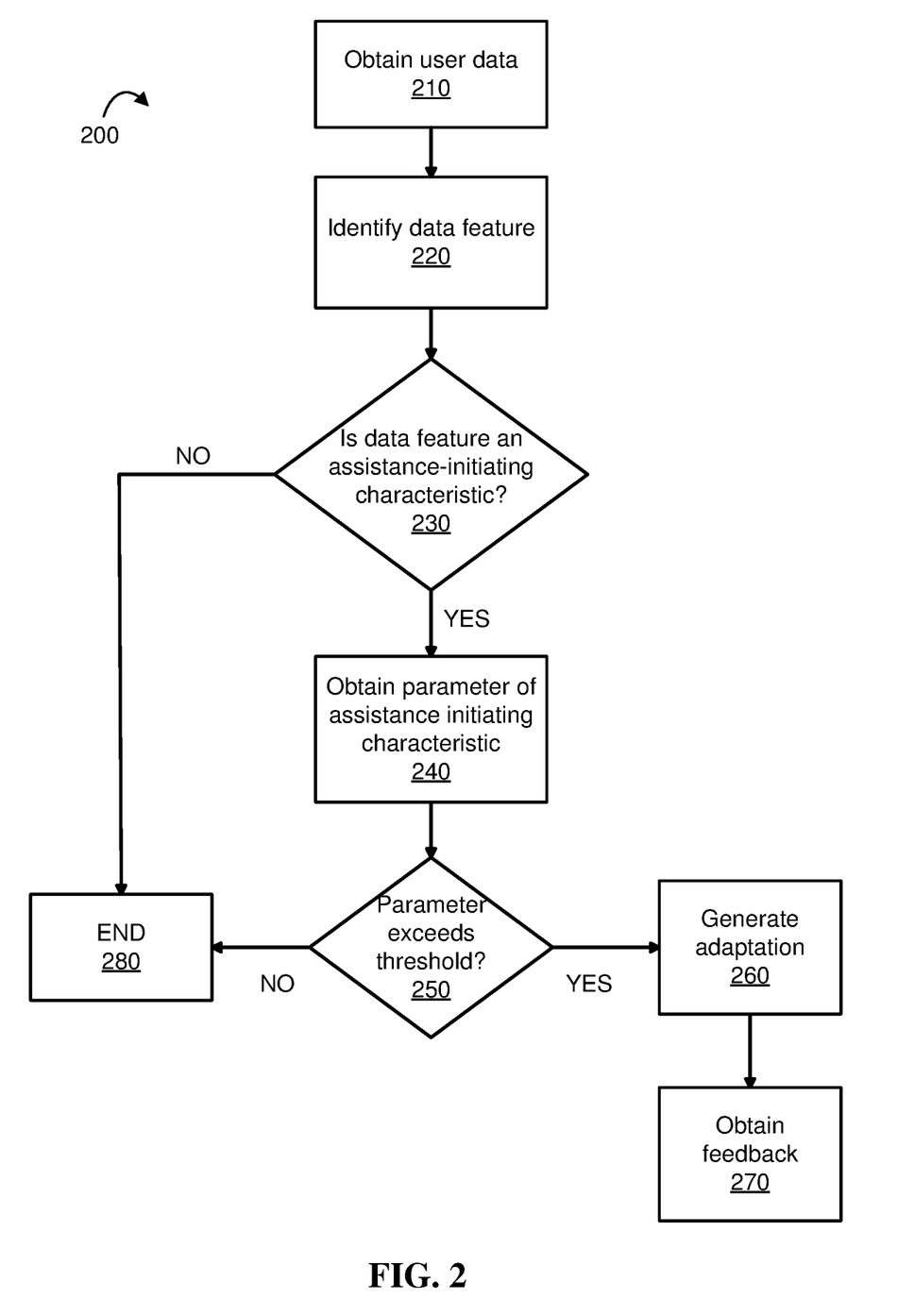
FIG. 2 depicts a flowchart of an example method for generating an adaptation, in accordance with embodiments of the present disclosure.

FIG. 2 illustrates a flowchart of an example method 200 for generating an adaptation, in accordance with embodiments of the present disclosure. The method 200 can be performed by an assistance management system, such as the assistance management system 150 described with respect to FIG. 1.

Referring back to FIG. 2, in step 210, the assistance management system can obtain user data. In some embodiments, user data can include images, sounds, and position information of the user. In some embodiments, user data can include user feedback and user responses regarding consent to share data with the assistance management system. In some embodiments, the assistance management system can obtain user data from one or more data capture devices, such as cameras and/or sensors. In some embodiments, the assistance management system can obtain user data from a user device, such as a smart phone.

In step 220, the assistance management system can implement image analysis technology, audio analysis technology, and/or positional analysis technology to identify data features in the obtained user data. In some embodiments, data features can include features such as people, objects, user motions, and user expressions that the assistance management system can identify from the obtained user data.

In step 230, the assistance management system can determine whether the data features identified in step 220 are assistance-initiating characteristics. In some embodiments, an assistance-initiating characteristic can be a data feature or a set of data features that indicate that a user may benefit from an adaptation. By determining such assistance-initiating characteristics, the assistance management system can determine one or more characteristics that can indicate that a user may benefit from assistance. For example, recorded images of a user pacing back and forth in the same general location over a period of time can include a set of assistance-initiating characteristics that indicate that the user may be lost and may benefit from assistance with directions. In another example, recorded images of a user walking toward an elevator while carrying multiple items in each hand can include a set of assistance-initiating characteristics that indicate that the user may benefit from a voice-controlled interface to operate the elevator, as opposed to a standard push-button-controlled interface.

In step 230, the assistance management system can compare one or more data features to a set of predetermined assistance-initiating characteristics, such as a set of predetermined assistance-initiating characteristics stored in a database. In some embodiments, if the assistance management system determines that one or more data features match one or more assistance-initiating characteristics, then the assistance management system can proceed to step 240. In some embodiments, if the assistance management system determines that one or more data features do not match one or more assistance-initiating characteristics, then the method 200 can end at step 280.

In step 240, the assistance management system can obtain one or more parameters of the assistance-initiating characteristics determined in step 230. Continuing with the example of the user pacing back and forth discussed above, the assistance management system can obtain parameters such as a size of a region traversed by the user and a length of time the user remains within that region.

In step 250, the assistance management system can determine whether the one or more parameters obtained in step 240 exceeds a threshold. In some embodiments, thresholds utilized by the assistance management system can be predetermined based on a likelihood of indicating that a user may benefit from an adaptation. For example, in some embodiments, a programmer of the assistance management system can obtain information showing that a user who, while viewing a display, squints his eyes for more than 30 seconds and positions his face less than 0.45 m (1.5 ft.) away from a display may benefit from modified screen settings. In this example, the programmer can select the 30 second time and the 0.45-m (1.5-ft.) distance as thresholds for determining whether to generate an adaptation. In some embodiments, if the one or more thresholds are exceeded, then the assistance management system can proceed to step 260. In some embodiments, if the one or more thresholds are not exceeded, then the method 200 can end at step 280.

In step 260, the assistance management system can generate an adaptation based on the assistance-initiating characteristics determined in step 230. In some embodiments, generating an adaptation can include an automatic adjustment to an adaptable device, such as increasing a text size and images shown on a display. In some embodiments, generating an adaptation can include transmitting a command or message to a notification device, user device, or adaptable device.

In some embodiments, in step 270, the assistance management system can obtain feedback from a user regarding the helpfulness of an adaptation generated in step 260. In some embodiments, a user can transmit such feedback to the assistance management system from a user device or from an adaptable device, such as a kiosk.

In some embodiments, one or more steps (e.g., steps 230, 240, and 250) of the method 200 can be substituted with machine learning or deep learning processes. In such processes, algorithms or models can be generated by performing supervised, unsupervised, or semi-supervised training on a dataset, and subsequently applying the generated algorithm or model to predict a result. For example, in some embodiments, a processor (e.g. processor 310, FIG. 3) of the assistance management system can include a trained machine learning model that can receive user data or a set of data features and predict assistance-initiating characteristics among the received user data or data features. In some embodiments, such a trained machine learning model can receive user data or a set of data features and predict whether a user would likely benefit from an adaptation and/or whether to generate an adaptation. In some embodiments, user feedback obtained by the assistance management system in step 270 can be used to train the machine learning model.

Machine learning algorithms can include, but are not limited to, decision tree learning, association rule learning, artificial neural networks, deep learning, inductive logic programming, support vector machines, clustering, Bayesian networks, reinforcement learning, representation learning, similarity/metric training, sparse dictionary learning, genetic algorithms, rule-based learning, and/or other machine learning techniques.

For example, the machine learning algorithms can utilize one or more of the following example techniques: K-nearest neighbor (KNN), learning vector quantization (LVQ), self-organizing map (SOM), logistic regression, ordinary least squares regression (OLSR), linear regression, stepwise regression, multivariate adaptive regression spline (MARS), ridge regression, least absolute shrinkage and selection operator (LASSO), elastic net, least-angle regression (LARS), probabilistic classifier, naïve Bayes classifier, binary classifier, linear classifier, hierarchical classifier, canonical correlation analysis (CCA), factor analysis, independent component analysis (ICA), linear discriminant analysis (LDA), multidimensional scaling (MDS), non-negative metric factorization (NMF), partial least squares regression (PLSR), principal component analysis (PCA), principal component regression (PCR), Sammon mapping, t-distributed stochastic neighbor embedding (t-SNE), bootstrap aggregating, ensemble averaging, gradient boosted decision tree (GBRT), gradient boosting machine (GBM), inductive bias algorithms, Q-learning, state-action-reward-state-action (SARSA), temporal difference (TD) learning, apriori algorithms, equivalence class transformation (ECLAT) algorithms, Gaussian process regression, gene expression programming, group method of data handling (GMDH), inductive logic programming, instance-based learning, logistic model trees, information fuzzy networks (IFN), hidden Markov models, Gaussian naïve Bayes, multinomial naïve Bayes, averaged one-dependence estimators (AODE), Bayesian network (BN), classification and regression tree (CART), chi-squared automatic interaction detection (CHAID), expectation-maximization algorithm, feed-forward neural networks, logic learning machine, self-organizing map, single-linkage clustering, fuzzy clustering, hierarchical clustering, Boltzmann machines, convolutional neural networks, recurrent neural networks, hierarchical temporal memory (HTM), and/or other machine learning techniques.

Figure 3:
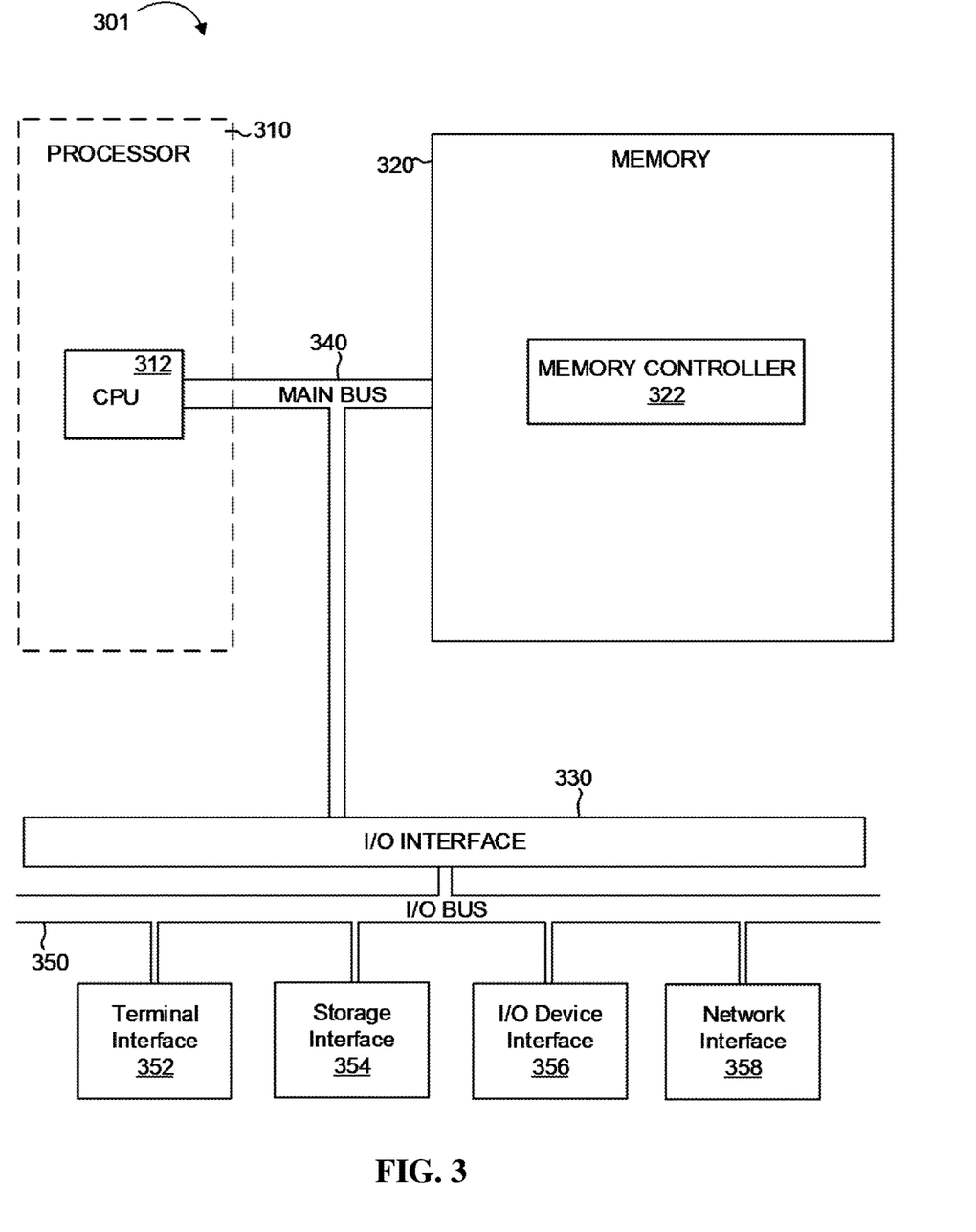
FIG. 3 depicts the representative major components of a computer system that can be used in accordance with embodiments of the present disclosure.

FIG. 3 depicts the representative major components of an exemplary Computer System 301 that can be used in accordance with embodiments of the present disclosure. The particular components depicted are presented for the purpose of example only and are not necessarily the only such variations. The Computer System 301 can comprise a Processor 310, Memory 320, an Input/Output Interface (also referred to herein as I/O or I/O Interface) 330, and a Main Bus 340. The Main Bus 340 can provide communication pathways for the other components of the Computer System 301. In some embodiments, the Main Bus 340 can connect to other components such as a specialized digital signal processor (not depicted).

The Processor 310 of the Computer System 301 can be comprised of one or more CPUs 312. The Processor 310 can additionally be comprised of one or more memory buffers or caches (not depicted) that provide temporary storage of instructions and data for the CPU 312. The CPU 312 can perform instructions on input provided from the caches or from the Memory 320 and output the result to caches or the Memory 320. The CPU 312 can be comprised of one or more circuits configured to perform one or more methods consistent with embodiments of the present disclosure. In some embodiments, the Computer System 301 can contain multiple Processors 310 typical of a relatively large system. In other embodiments, however, the Computer System 301 can be a single processor with a singular CPU 312.

The Memory 320 of the Computer System 301 can be comprised of a Memory Controller 322 and one or more memory modules for temporarily or permanently storing data (not depicted). In some embodiments, the Memory 320 can comprise a random-access semiconductor memory, storage device, or storage medium (either volatile or non-volatile) for storing data and programs. The Memory Controller 322 can communicate with the Processor 310, facilitating storage and retrieval of information in the memory modules. The Memory Controller 322 can communicate with the I/O Interface 330, facilitating storage and retrieval of input or output in the memory modules. In some embodiments, the memory modules can be dual in-line memory modules.

The I/O Interface 330 can comprise an I/O Bus 350, a Terminal Interface 352, a Storage Interface 354, an I/O Device Interface 356, and a Network Interface 358. The I/O Interface 330 can connect the Main Bus 340 to the I/O Bus 350. The I/O Interface 330 can direct instructions and data from the Processor 310 and Memory 320 to the various interfaces of the I/O Bus 350. The I/O Interface 330 can also direct instructions and data from the various interfaces of the I/O Bus 350 to the Processor 310 and Memory 320. The various interfaces can comprise the Terminal Interface 352, the Storage Interface 354, the I/O Device Interface 356, and the Network Interface 358. In some embodiments, the various interfaces can comprise a subset of the aforementioned interfaces (e.g., an embedded computer system in an industrial application may not include the Terminal Interface 352 and the Storage Interface 354).

Logic modules throughout the Computer System 301—including but not limited to the Memory 320, the Processor 310, and the I/O Interface 330—can communicate failures and changes to one or more components to a hypervisor or operating system (not depicted). The hypervisor or the operating system can allocate the various resources available in the Computer System 301 and track the location of data in Memory 320 and of processes assigned to various CPUs 312. In embodiments that combine or rearrange elements, aspects of the logic modules' capabilities can be combined or redistributed. These variations would be apparent to one skilled in the art.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model can include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but can be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It can be managed by the organization or a third party and can exist on-premises or off-premises.

Community cloud: the cloud infrastructure is shared by several organizations and supports a specific community that has shared concerns (e.g., mission, security requirements, policy, and compliance considerations). It can be managed by the organizations or a third party and can exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 4:
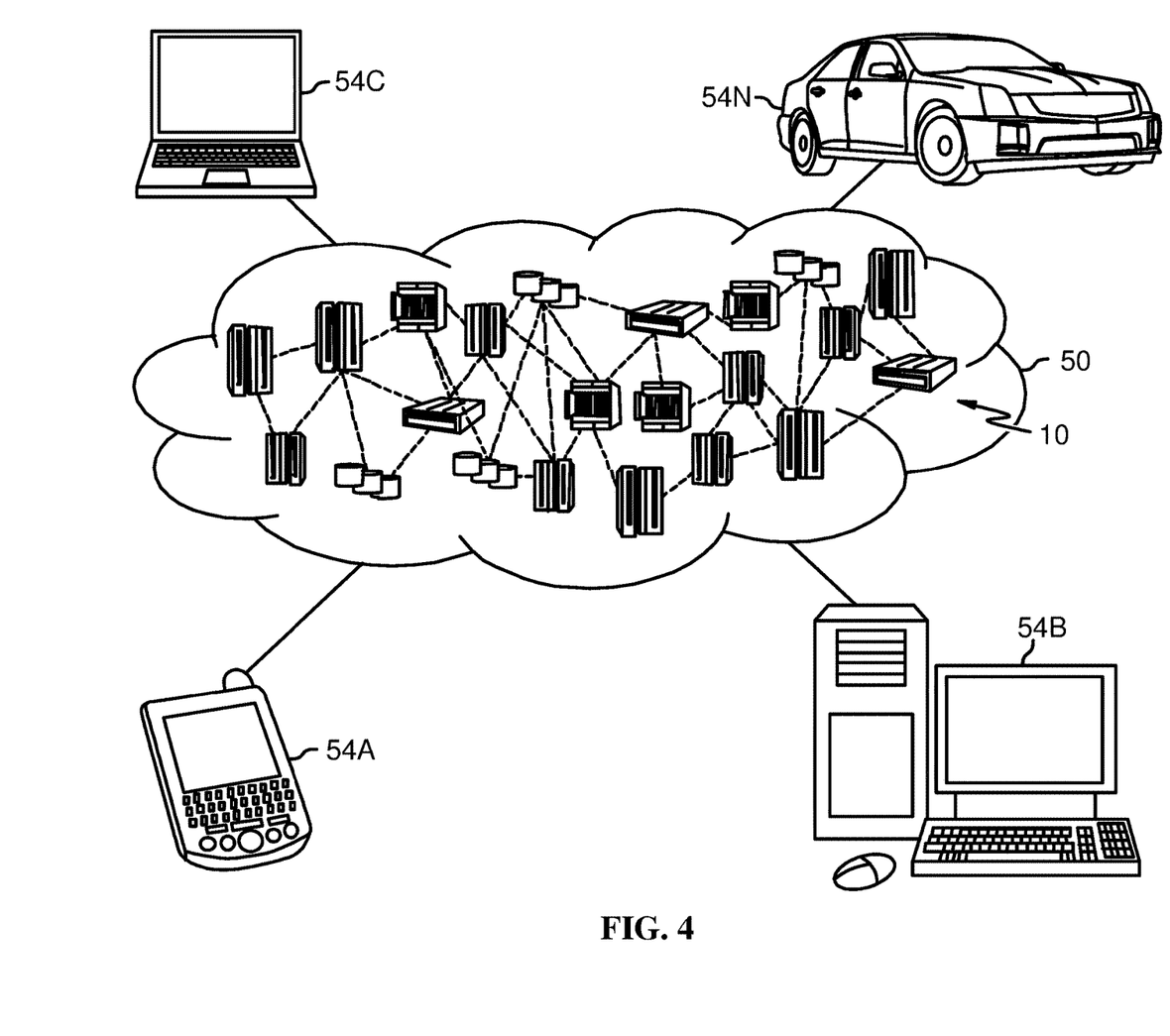
FIG. 4 depicts a cloud computing environment according to an embodiment of the present disclosure.

Referring now to FIG. 4, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N can communicate. Nodes 10 can communicate with one another. They can be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 4 are intended to be illustrative only and that computing nodes 10 and cloud computing environment 50 can communicate with any type of computerized device over any type of network and/or network addressable connection (e.g., using a web browser).

Figure 5:
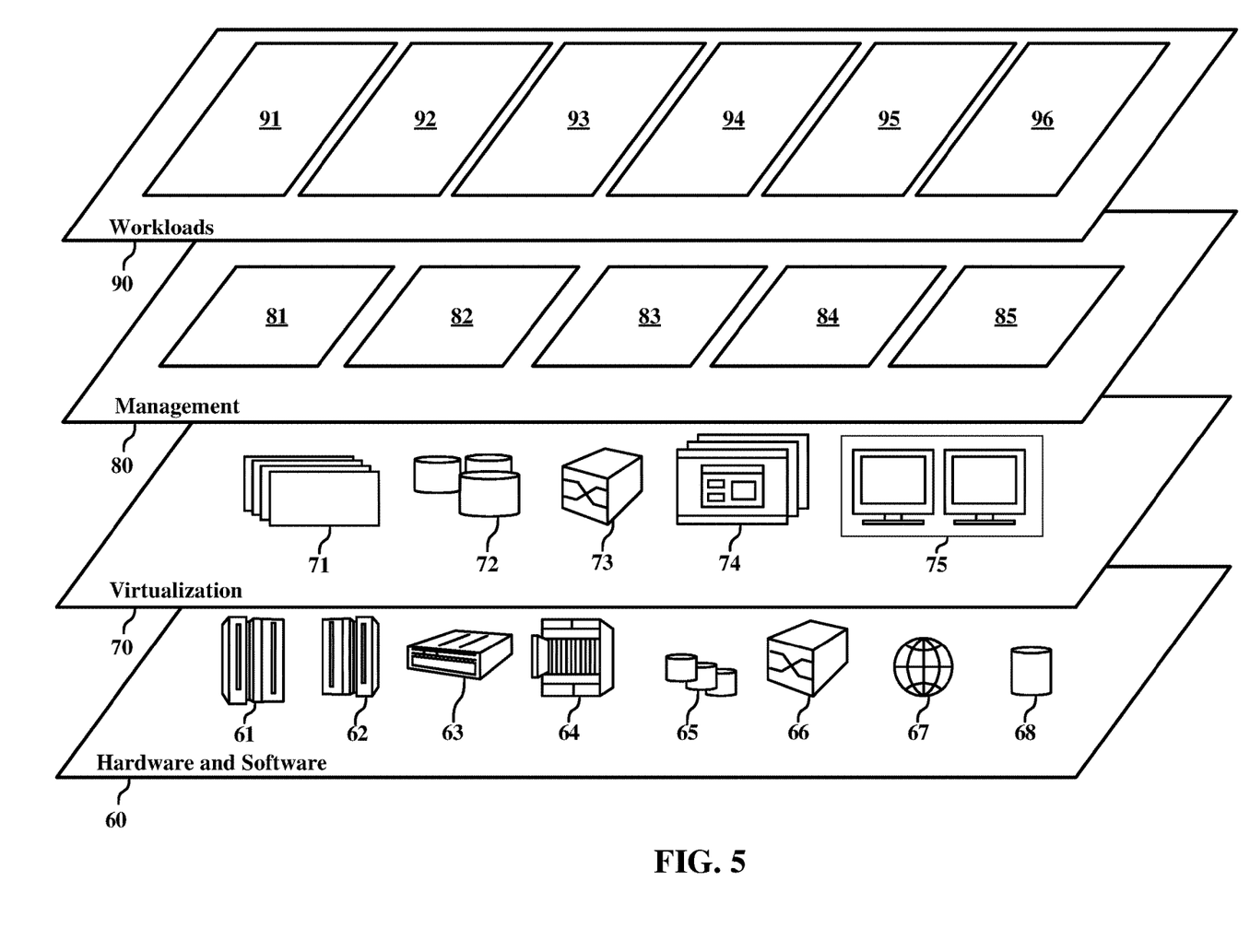
FIG. 5 depicts abstraction model layers according to an embodiment of the present disclosure.

Referring now to FIG. 5, a set of functional abstraction layers provided by cloud computing environment 50 (FIG. 4) is shown. It should be understood in advance that the components, layers, and functions shown in FIG. 5 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities can be provided: virtual servers 71; virtual storage 72; virtual networks 73, including virtual private networks; virtual applications and operating systems 74; and virtual clients 75.

In one example, management layer 80 can provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources can comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment can be utilized. Examples of workloads and functions which can be provided from this layer include: mapping and navigation 91; software development and lifecycle management 92; virtual classroom education delivery 93; data analytics processing 94; transaction processing 95; and assistance management logic 96.

As discussed in more detail herein, it is contemplated that some or all of the operations of some of the embodiments of methods described herein can be performed in alternative orders or may not be performed at all; furthermore, multiple operations can occur at the same time or as an internal part of a larger process.

The present invention can be a system, a method, and/or a computer program product. The computer program product can include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium can be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network can comprise copper transmission cables, optical transmission fibers, wireless transmission, routers, firewalls, switches, gateway computers, and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention can be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions can execute entirely on the user's computer, partly on the user's computer, as a stand-alone software package, partly on the user's computer and partly on a remote computer or entirely on the remote computer or server. In the latter scenario, the remote computer can be connected to the user's computer through any type of network, including a local area network (LAN) or a wide area network (WAN), or the connection can be made to an external computer (for example, through the Internet using an Internet Service Provider). In some embodiments, electronic circuitry including, for example, programmable logic circuitry, field-programmable gate arrays (FPGA), or programmable logic arrays (PLA) can execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions can be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions can also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions can also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams can represent a module, segment, or portion of instructions, which comprises one or more executable instructions for implementing the specified logical function(s). In some alternative implementations, the functions noted in the block can occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting of the various embodiments. As used herein, the singular forms "a," "an," and "the" are intended to include the plural forms as well, unless the context clearly indicates otherwise. It will be further understood that the terms "includes" and/or "including," when used in this specification, specify the presence of the stated features, integers, steps, operations, elements, and/or components, but do not preclude the presence or addition of one or more other features, integers, steps, operations, elements, components, and/or groups thereof. In the previous detailed description of example embodiments of the various embodiments, reference was made to the accompanying drawings (where like numbers represent like elements), which form a part hereof, and in which is shown by way of illustration specific example embodiments in which the various embodiments can be practiced. These embodiments were described in sufficient detail to enable those skilled in the art to practice the embodiments, but other embodiments can be used and logical, mechanical, electrical, and other changes can be made without departing from the scope of the various embodiments. In the previous description, numerous specific details were set forth to provide a thorough understanding the various embodiments. But, the various embodiments can be practiced without these specific details. In other instances, well-known circuits, structures, and techniques have not been shown in detail in order not to obscure embodiments.

Different instances of the word "embodiment" as used within this specification do not necessarily refer to the same embodiment, but they can. Any data and data structures illustrated or described herein are examples only, and in other embodiments, different amounts of data, types of data, fields, numbers and types of fields, field names, numbers and types of rows, records, entries, or organizations of data can be used. In addition, any data can be combined with logic, so that a separate data structure may not be necessary. The previous detailed description is, therefore, not to be taken in a limiting sense.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to explain the principles of the embodiments, the practical application or technical improvement over technologies found in the marketplace, or to enable others of ordinary skill in the art to understand the embodiments disclosed herein.

What is claimed is:

1. A method comprising:
    determining an assistance-initiating characteristic corresponding to a user, wherein the assistance-initiating characteristic indicates a difficulty of using an adaptable device and wherein determining the assistance-initiating characteristic comprises determining that a distance between the user's face and a display of the adaptable device is less than a threshold distance; and
    generating, in response to determining the assistance-initiating characteristic, an adaptation comprising transmitting a message to a user device.

2. The method of claim 1, wherein the method further comprises:
    obtaining one or more images of the user performing a user action; and
    wherein determining the assistance-initiating characteristic is based, at least in part, on the one or more images.

3. The method of claim 2, wherein the method further comprises:
    analyzing the one or more images to identify data features included in the one or more images; and
    determining the assistance-initiating characteristic among the data features.

4. The method of claim 1, wherein generating the adaptation further comprises automatically changing a size of text displayed on the adaptable device.

5. The method of claim 1, wherein the determining the assistance-initiating characteristic is performed by a machine learning model, and wherein the method further comprises:
    obtaining user feedback regarding the adaptation; and
    training the machine learning model with the user feedback.

6. The method of claim 1, wherein determining the assistance-initiating characteristic comprises determining that a time that a user's eyes are squinted exceeds a threshold time.

7. An assistance management system comprising:
    a processor; and
    a memory in communication with the processor, the memory containing program instructions that, when executed by the processor, are configured to cause the processor to perform a method, the method comprising:
        determining an assistance-initiating characteristic corresponding to a user, wherein determining the assistance-initiating characteristic comprises determining that a distance between the user's face and a display of the adaptable device is less than a threshold distance, and wherein the assistance-initiating characteristic indicates a difficulty of using the adaptable device; and generating, in response to determining the assistance-initiating characteristic, an adaptation comprising notifying support staff for the adaptable device.

8. The system of claim 7, wherein the method further comprises:

obtaining one or more images of the user performing a user action; and wherein determining the assistance-initiating characteristic is based, at least in part, on the one or more images.

9. The system of claim 8, wherein the method further comprises:

analyzing the one or more images to identify data features included in the one or more images; and determining the assistance-initiating characteristic among the data features.

10. The system of claim 7, wherein determining the assistance-initiating characteristic comprises utilizing a machine learning model, and wherein the method further comprises:

obtaining user feedback regarding the adaptation; and training the machine learning model with the user feedback.

11. The assistance management system of claim 7, wherein determining the assistance-initiating characteristic comprises determining that a time that a user's eyes are squinted exceeds a threshold time.

12. A computer program product comprising a computer readable storage medium having program instructions embodied therewith, wherein the computer readable storage medium is not a transitory signal per se, the program instructions executable by a processor to cause the processor to perform a method, the method comprising:

determining an assistance-initiating characteristic corresponding to a user, wherein the assistance-initiating characteristic indicates that the user has a hearing impairment;

generating, in response to determining the assistance-initiating characteristic, an adaptation comprising automatically transmitting a transcript of an audible announcement to a user device of the user.

13. The computer program product of claim 12, wherein determining the assistance-initiating characteristic comprises utilizing a machine learning model, and wherein the method further comprises:

obtaining user feedback regarding the adaptation; and training the machine learning model with the user feedback.

* * * * *